June 21, 1960
M. F. THOMPSON
2,942,076
SELECTIVE ELECTRICAL CONTROL APPARATUS FOR
PARLIAMENTARY VOTING SYSTEMS
Filed Aug. 7, 1957
7 Sheets-Sheet 1
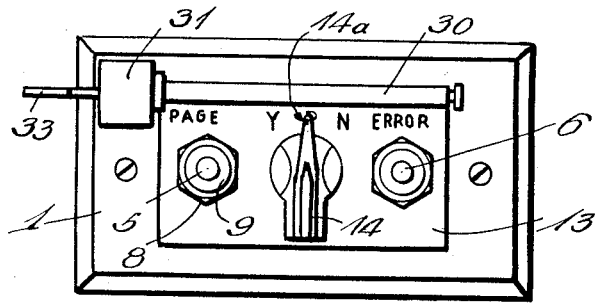
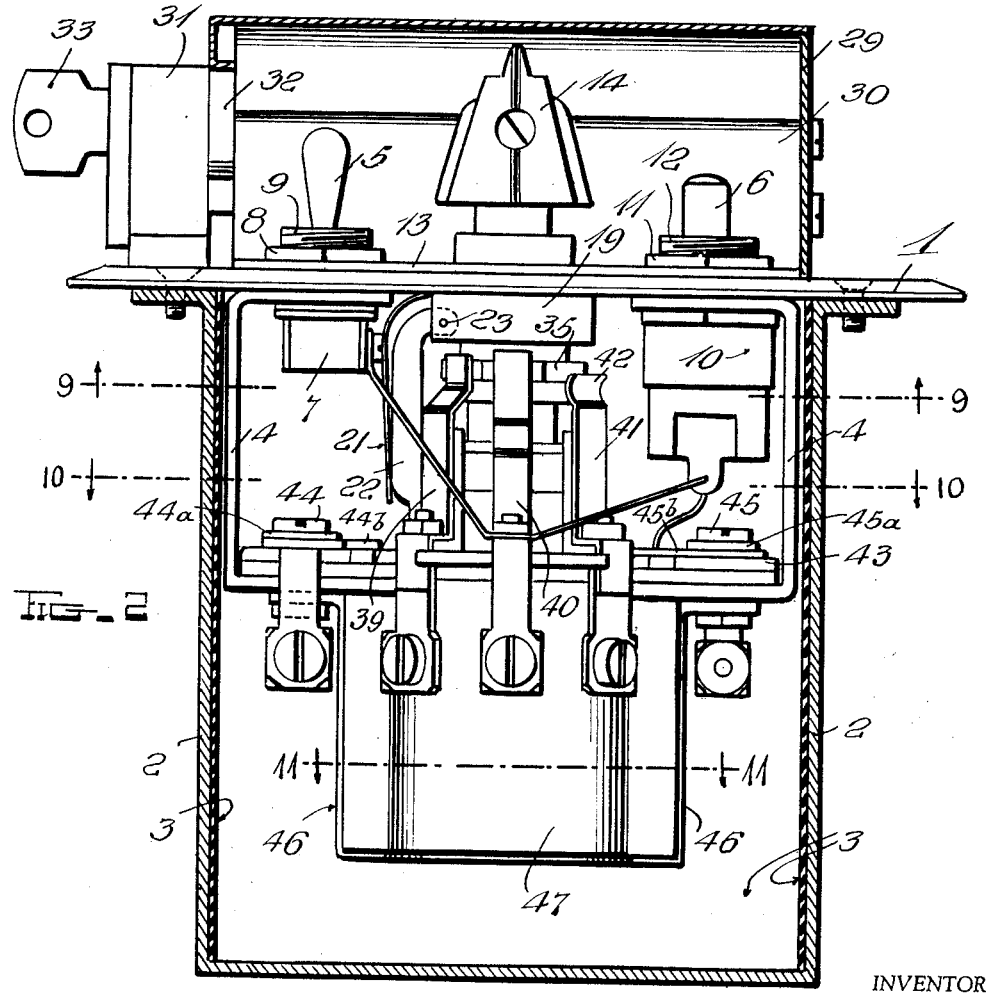
INVENTOR
Marshall F. Thompson,
BY
John B. Brady
ATTORNEY June 21, 1960
M. F. THOMPSON
2,942,076
SELECTIVE ELECTRICAL CONTROL APPARATUS FOR
PARLIAMENTARY VOTING SYSTEMS
Filed Aug. 7, 1957
7 Sheets-Sheet 2
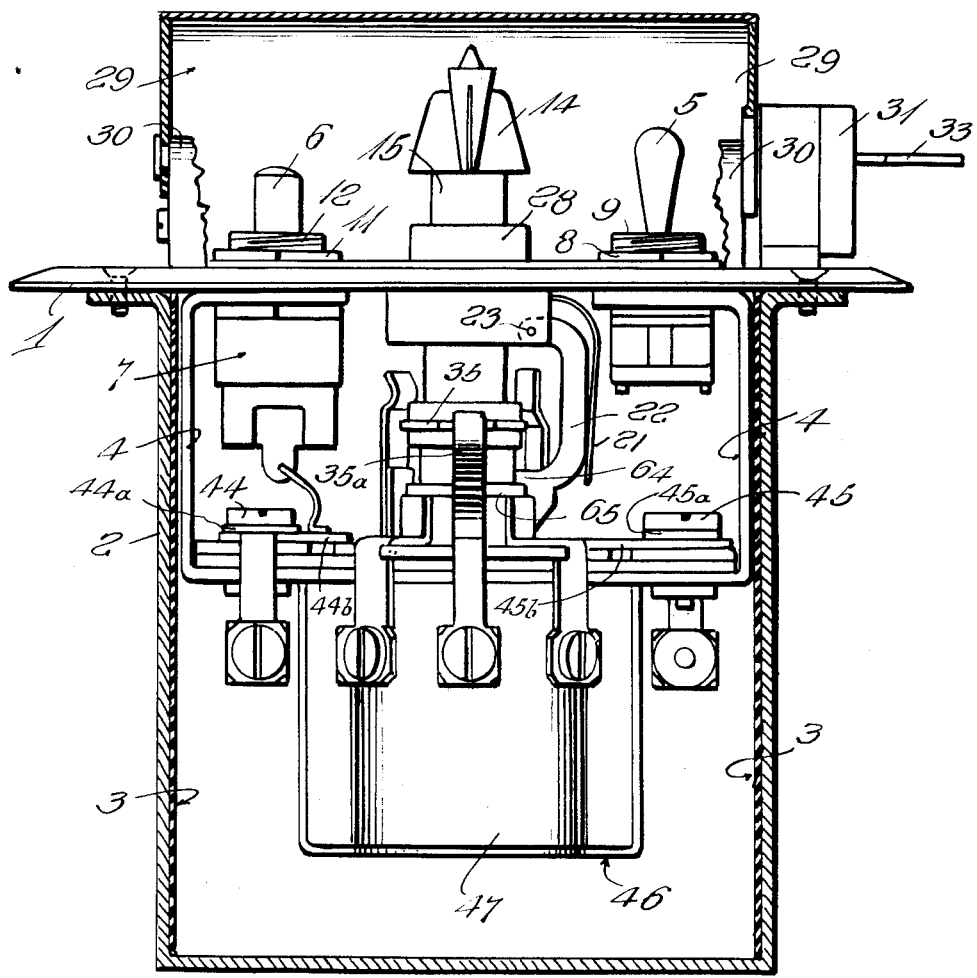
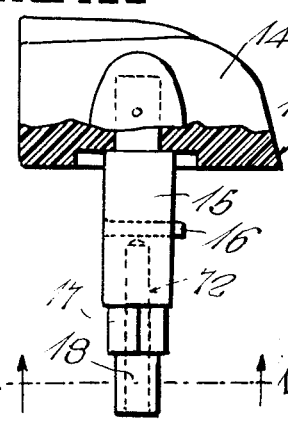
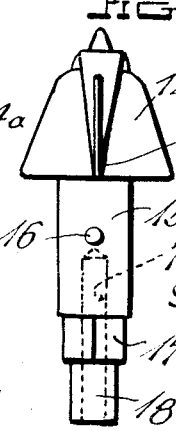
INVENTOR
Marshall F. Thompson,
BY John B. Brady
ATTORNEY June 21, 1960 M. F. THOMPSON 2,942,076
SELECTIVE ELECTRICAL CONTROL APPARATUS FOR
PARLIAMENTARY VOTING SYSTEMS
Filed Aug. 7, 1957 7 Sheets-Sheet 3
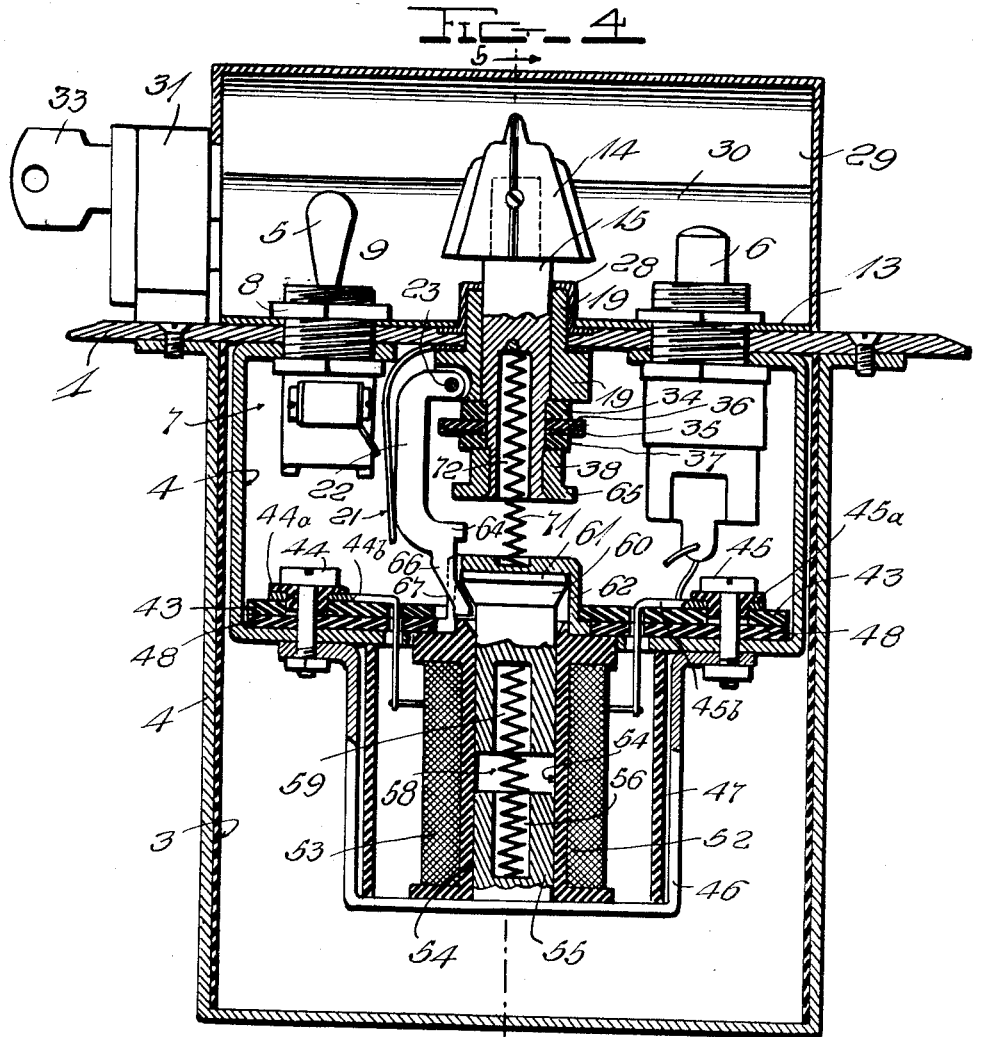
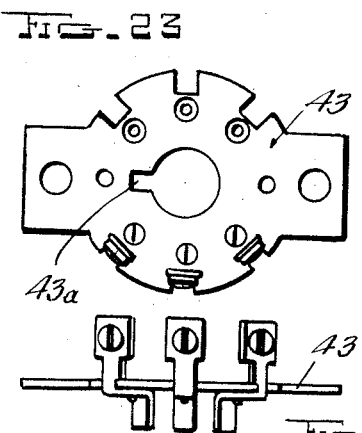
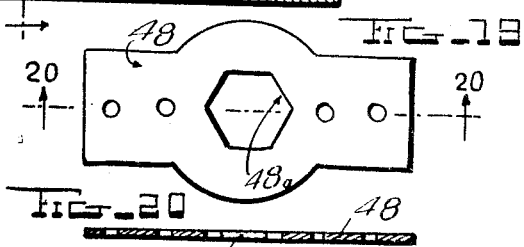
INVENTOR
Marshall F. Thompson,
BY
John B. Brady
ATTORNEY June 21, 1960

M. F. THOMPSON 2,942,076

SELECTIVE ELECTRICAL CONTROL APPARATUS FOR
PARLIAMENTARY VOTING SYSTEMS

Filed Aug. 7, 1957

FIG_5

FIG_6

FIG_21

FIG_22

INVENTOR
Marshall F. Thompson,
BY
John B. Brady
ATTORNEY

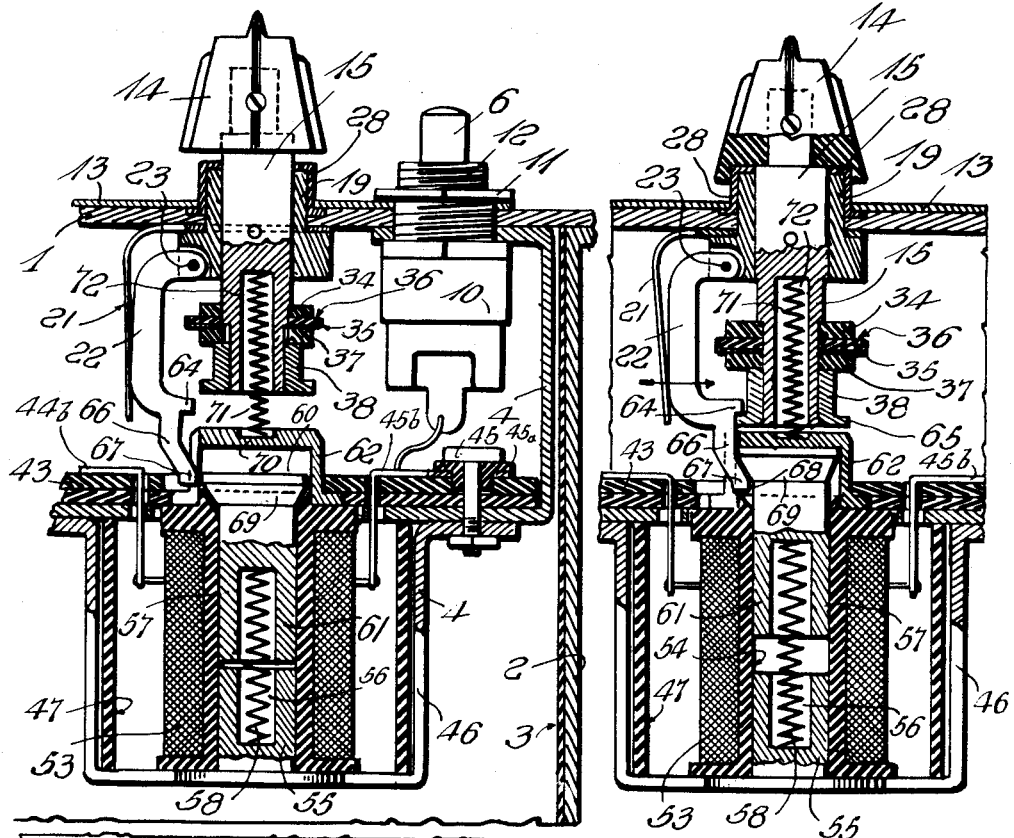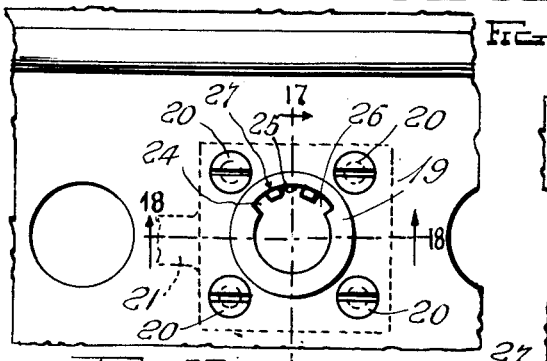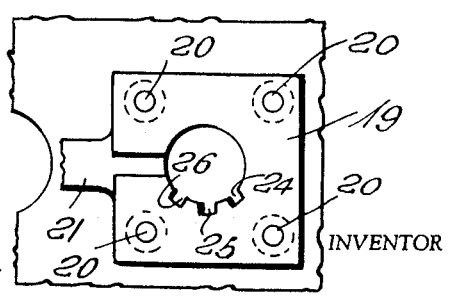

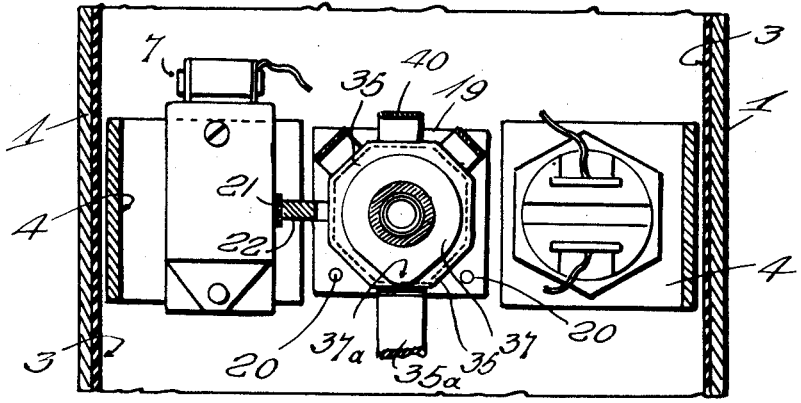
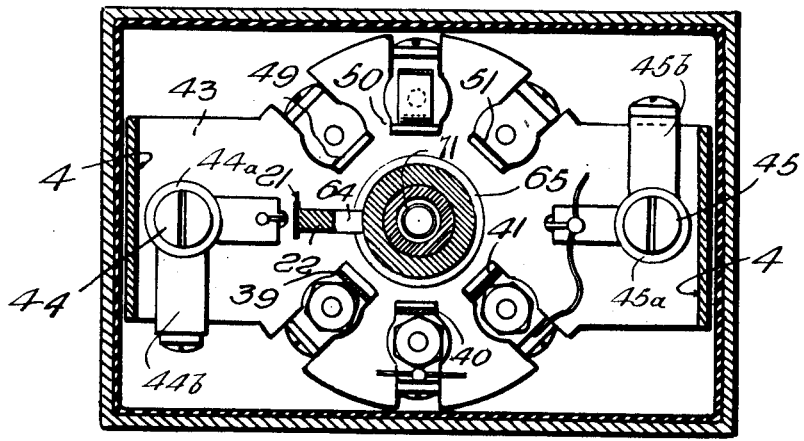
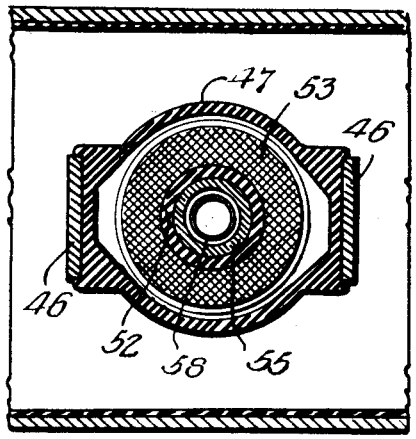
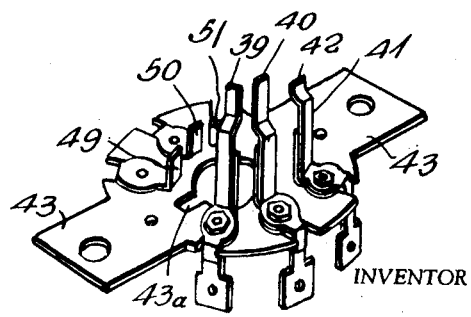

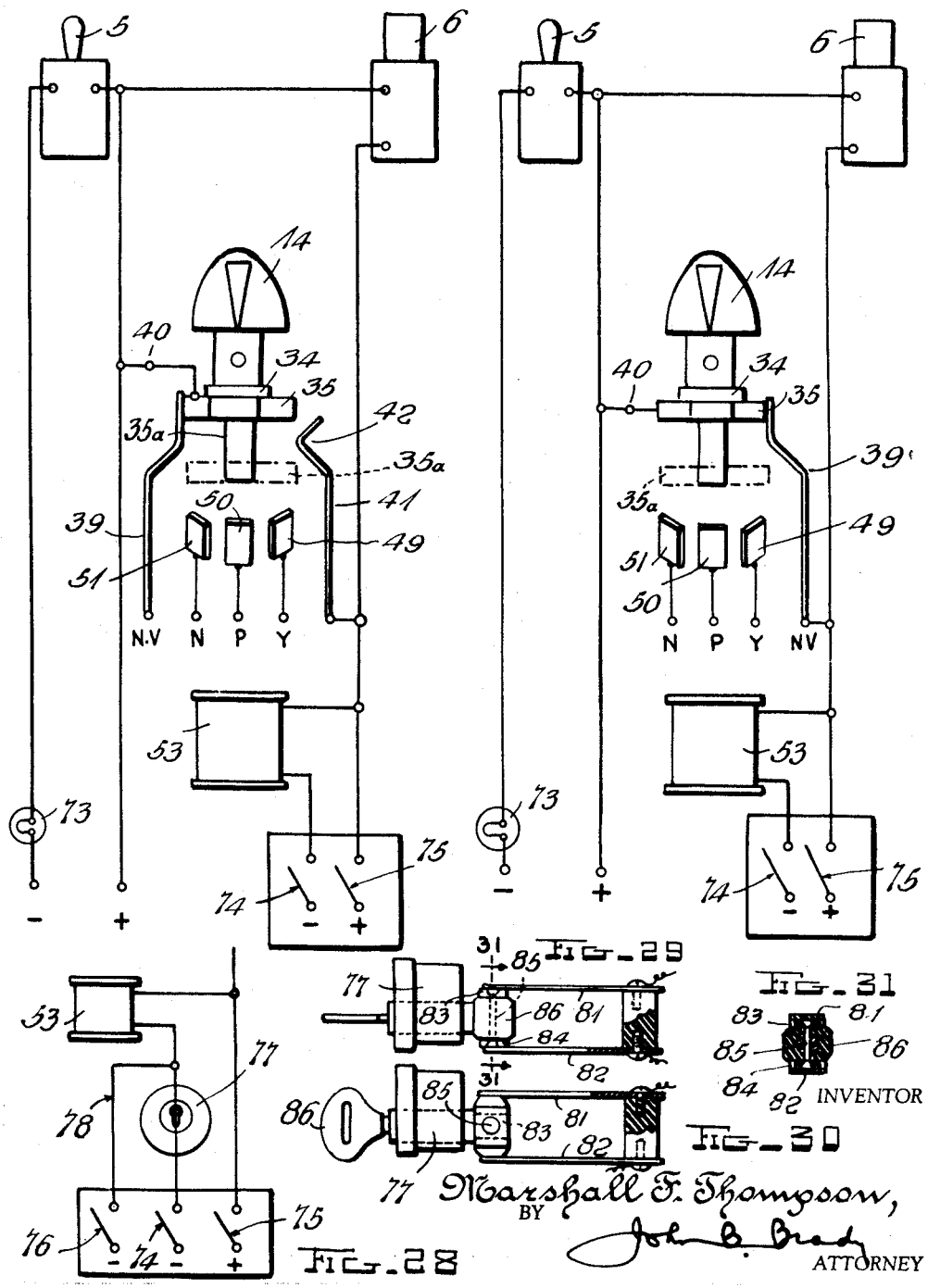

United States Patent Office 2,942,076
Patented June 21, 1960

2,942,076
SELECTIVE ELECTRICAL CONTROL APPARATUS FOR PARLIAMENTARY VOTING SYSTEMS

Marshall F. Thompson, 3112 W. Marshall St., Richmond, Va.

Filed Aug. 7, 1957, Ser. No. 676,857

6 Claims. (Cl. 200—87)

My invention relates broadly to parliamentary electrical voting systems, and more particularly to a selective control device for actuating the voting circuits of an electrical voting system.

One of the objects of my invention is to provide a selective control device for electrical voting systems in which a voting member may readily control the "yea," "present," or "nay" circuits of an electrical voting system, with ability to change the selected vote any time prior to the locking of the voting circuits from a remote position by the clerk, wherein the parts of the device are considerably reduced in number and complication over those heretofore required in comparable devices, thus simplifying production problems and decreasing manufacturing costs of the device.

Another object of my invention is to provide a construction of voting switch for a parliamentary voting system in which the switch actuator is conveniently orientatable by the member in a horizontal plane to selected voting positions prior to the locking of the switch actuator in one of the selected positions for the recording of the vote, and in which the switch actuator is movable in a vertical direction at the time of locking the position of the actuator in one of the selected positions for the recording of the vote, and in which the switch actuator may be locked both at the switch and remotely against the recording of any vote or the release thereof, and in which the switch actuator may be released or reset both at the switch and remotely from any of its voted positions to its normal position of registering "not-voting."

Still another object of my invention is to provide a compact assembly of selective electrical contactors in a solenoid operated voting switch, including means for latching the switch in a selectively set position for effecting the recording of the vote, where the switch has composite movement in both a vertical and a horizontal plane.

A further object of my invention is to provide a compact assembly of voting switch for electrical voting systems, including an associated paging switch, and an error control switch enabling an individual member to release the associated voting switch for changing the vote prior to the recording thereof, with all said components protected against unauthorized or improper operation.

Another object of my invention is to provide a construction of solenoid operated voting switch in which the switch includes a vertically movable actuating device which is orientatable in a horizontal plane when in an elevated position but which is locked against orientation when in a depressed position, the mechanism including a solenoid operated latching bar which maintains the vertically movable actuating device in depressed position.

Other and further objects of my invention reside in the assembly of switch actuator and latching bar controllable by a solenoid, as set forth more fully in the specification hereinafter following by reference to the accompanying drawings in which:

Figure 1 is a top plan view of the selective control device of my invention with the top cover removed for more clearly showing the voting switch assembly;

Fig. 2 is a front elevational view of the switch assembly with the cover and protective case illustrated in vertical section;

Fig. 3 is a rear elevational view of the switch assembly shown in Fig. 2, that is, a view looking in the opposite direction from the direction in which Fig. 2 is drawn;

Fig. 4 is a central vertical longitudinal sectional view similar to the view illustrated in Fig. 2, with the switch actuator shown in the upper position thereof, free to orient in a horizontal plane;

Fig. 5 is a transverse vertical sectional view on line 5—5 of Fig. 4, with the actuator shown in the up position;

Fig. 6 is a view similar to the view shown in Fig. 5 with the solenoid having been momentarily energized and de-energized, and the switch actuator moved to the lower position in which the actuator is locked against orientation;

Fig. 7 is a fragmentary vertical sectional view showing the solenoid in its momentarily energized position for laterally displacing the latching bar while the switch actuator is being moved downwardly in a selected voting position;

Fig. 8 is a view similar to the view shown in Fig. 7, wherein after the de-energization of the solenoid, the latching bar has engaged the switch actuator for maintaining the actuator in depressed locked position for the recording of a vote;

Fig. 9 is a transverse horizontal sectional view taken on line 9—9 of Fig. 2, looking in an upward direction;

Fig. 10 is a similar view to that of Fig. 9, taken on line 10—10 of Fig. 2, looking in a downward direction;

Fig. 11 is a transverse horizontal sectional view taken on line 11—11 of Fig. 2;

Fig. 12 is a side elevational view of the switch actuator partially broken away and illustrated in section, the view showing the horizontal pin in one side thereof which coacts with the three slots in the switch actuator guide for maintaining the switch actuator in any one of three selected positions;

Fig. 13 is a side view of the switch actuator illustrated in Fig. 12, looking at the end of the horizontal pin;

Fig. 14 is a horizontal sectional view through the switch actuator on line 14—14 of Fig. 12;

Fig. 15 is a fragmentary top plan view of the switch actuator guide showing the distribution of the slots in the interior wall thereof with which the horizontal pin on the switch actuator coacts;

Fig. 16 is a bottom plan view of the switch actuator guide shown in Fig. 15;

Fig. 17 is a vertical sectional view through the switch actuator guide on line 17—17 of Fig. 15;

Fig. 18 is a vertical sectional view through the switch actuator guide on line 18—18 of Fig. 15;

Fig. 19 is a view of the insulated support for the contact mounting plate of the contact assembly of the voting switch;

Fig. 20 is a vertical sectional view on line 20—20 of Fig. 19;

Fig. 21 is a perspective view of the insulated support shown in Figs. 19 and 20;

Fig. 22 is a perspective view of the cap which fits over the armature of the solenoid and which includes a recess therein for centering the spring which normally biases the switch actuator to raised position;

Fig. 23 is a top plan view of the contact assembly which coacts with the switch actuator;

Fig. 24 is a side elevational view of the contact assembly shown in Fig. 23;

Fig. 25 is a perspective view of the contact assembly support and the contact mounted thereon similar to the showing in Figs. 23 and 24;

Fig. 26 is a schematic wiring diagram of the switch when used in an "open circuit system" application of my invention, providing only a momentary operating impulse;

Fig. 27 is a schematic wiring diagram of the switch when used in a "closed circuit system" application of my invention;

Fig. 28 shows a modified form of my invention employing an electrical lock in lieu of a mechanical lock;

Fig. 29 is a schematic view of the electric lock of Fig. 28 showing the electric circuit closed and the lock in unlocked position;

Fig. 30 shows the electric lock of Fig. 28 moved to locked position and the electric circuit open; and Fig. 31 is a vertical sectional view on line 31—31 of Fig. 29 showing the electric circuit closed and the lock in unlocked position.

My invention is directed to a selective control device for parliamentary electrical voting systems, where the assembly is reduced to a relatively small number of components which may be readily mass produced at relatively low cost and in such compact form that the assembly is readily associated at the voting station with a paging switch and an error control switch. The device of my invention includes a switch actuator which is mounted for composite movement in a vertical and horizontal plane. The switch actuator operates within a switch actuator guide which is equipped with three longitudinally extending slots with which a horizontally disposed pin carried by the switch actuator coacts. The three slots throughout one portion of their length are connected through an arcuate groove allowing free orientation of the pin in the switch actuator, enabling the switch actuator to be selectively moved in a horizontal plane preparatory to selective axial movement in a vertical plane in effecting any one of the selected votes in the system. A solenoid mechanism is associated with the switch actuator enabling the switch actuator to be locked in a selected position for establishing contact with the associated selected circuits. A dust cover is provided for the protection of all of the electrical switches at the voting station and provides protection against unauthorized tampering with the device.

Referring to the drawings in more detail, reference character 1 designates the cover plate for the switch unit which coacts with the receptacle box 2 which protects the parts of the solenoid controlled mechanism. The receptacle box 2 has an inner lining 3 of insulation material. A bracket 4 is supported on the rear of the cover plate 1 through the fastening means associated with each of the switches on opposite sides of the switch actuator, that is, the page switch represented at 5 and the error switch represented at 6. The page switch secures one end of bracket 4 in position by the clamping effect between the switch housing 7 and the nut 8 which engages the screw-threaded portion 9 of the page switch 5. The opposite end of bracket 4 is maintained in position by the clamping effect obtained between the end of the switch housing terminating at nut 10 and the nut 11 which engages the screw-threaded portion 12 of the error switch 6. The cover plate 1 has a name plate 13 secured in position thereon immediately under the fastening nuts 8 and 11 of the page switch 5 and error switch 6 to provide indicia for displaying the designations "Page," "Y," "P," and "N" meaning "Yea," "Present," and "Nay" and also the designation "Error" adjacent the error switch 6. The switch actuator is located between the page and error switches and comprises the structure more clearly shown in Figs. 12, 13 and 14, consisting of the handle of insulation material 14 terminating in a feathered edge indicator 14a and connected with a cylindrical shank 15 carrying the horizontally extending pin 16 and a spring hole or recess 72, and having polygonally shaped intermediate portion 17 and terminating in a cylindrical extremity 18. The cover plate 1 provides a mounting means for a switch actuator guide 19 which is fastened by screws 20 to the cover plate and serves to clamp the latching bar leaf spring 21 in a position in which the leaf spring depends downwardly and serves to bias the latching bar 22 pivoted at 23 in the switch actuator guide 19 in a direction toward the axis of the switch actuator. The switch actuator guide 19 is provided with three vertically extending grooves 24, 25 and 26, spaced from each other in radial positions aligned with the positions to which the feathered edge 14a of the switch actuator handle 14 is aligned in positioning the switch actuator to align with the "Y," "P," and "N" designations on name plate 13. These three slots are interconnected at their upper ends by a groove designated at 27 within which the pin 16 is free to orient when the switch actuator is in its vertically upper limit position. However, when the switch actuator has been oriented to a selected position, the pin 16 is guided in the aligned slot 24, 25, or 26 as the switch actuator is pushed downwardly. A sealing member 28 is provided around the switch actuator and over the switch actuator guide 19 with an annular flange on the sealing member clamped between the name plate 13 and an annular groove in the cover plate 1 as shown more clearly in Figs. 4–8.

A cover 29 is provided for enclosing the page switch 5, the switch actuator 14 and the error switch 6, the cover being orientatable about a horizontal axis at the rear of the cover plate 1 on the lineally extending side wall upward projection 30. A lock is provided in housing 31 capable of moving a cam member 32 for raising or lowering the cover 29, or the cover 29 may be attached directly to the end of the rotating lock barrel without using a cam. The lock 31 is key actuated as represented at 33, enabling each member to control the voting station at the member's desk. When he leaves his desk, the member locks the station by the protection afforded by the cover 29 in the position illustrated in Figs. 2–3 with the cover 29 enclosing page switch 5, error switch 6 and switch actuator 14.

The polygonally shaped portion 17 of the shank 15 receives a washer member of insulation material designated at 34 which serves as a backing for the metallic member 35 which embraces the member 36 of insulation material. The metallic member 35 is also backed by the washer 37, the assembly being maintained in position on the polygonally shaped portion of the shank 15 by means of the locking sleeve 38 which fits over the cylindrical extremity 18 of the shank 15, and which is held in place by spreading the end 18a of recessed extremity 18.

To properly reinforce and support the metallic member 35, the washers 34 and 37 are elongated at one side thereof as designated at 37a in Fig. 9 in alignment with the spring tongue 35a of metallic member 35. The metallic member 35 is cup shaped and has a substantially octagonal periphery terminating in flat edge contact faces establishing connection with sets of vertically extending leaf springs shown at 39 and 40. The leaf spring 41 also provided in the contact assembly terminates in a resiliently biased wiping face 42 establishing contact with the peripheral edge of the metallic member 35. It will be noted that metallic member 35 is wholly insulated from the shank 15 by virtue of the fact that the octagonal cap portion thereof fits over the octagonal periphery of the member 36 which is further insulated from shank 15 by the washers 34 and 37 of insulation material. Thus the metallic member 35 is floatatingly insulated from the shank 15 but moves therewith as shank 15 is oriented.

The contact assembly is mounted upon the panel of insulation material represented at 43 supported at opposite ends from the bracket 4, by screws 44 and 45, which also supports the depending bracket 46, which serves as a hanger for mounting the solenoid casing 47. Screws 44 and 45 are provided with insulators 44a and 45a, under which are mounted in an insulated manner, the solenoid terminals 44b and 45b. The panel 43 is additionally insulated from the bracket 4 by means of the supplemental panel 48 which extends intermediate the bracket 4 and the panel 43. The panel 43 serves as a support for the additional contacts represented at 49, 50, and 51, which extend into the path of the tongue 35a of metallic member 35 when the switch actuator is in its lowermost position. That is to say, for any one of the oriented positions of the switch actuator 14 there is a selected contact 49, 50 or 51 engaged by the resilient end of the tongue 35a.

The solenoid casing 47 serves as a housing for the spool support 52 of the solenoid winding 53, having an axial bore extending therethrough, represented at 54. The bracket 46 which serves to mount the solenoid housing carries a core of magnetizable material represented at 55, extending in a vertical direction and provided with a cylindrical socket 56 therein. Immediately over the core 55 and slidable in the bore 54, I provide the armature member 57 actuated by the energization of the solenoid winding 53 to move downwardly toward the core 55 against the action of coil spring 58, which spring extends downwardly into the cylindrical socket 56 in core 55 and upwardly into the inverted cylindrical socket 59 in the armature member 57. Coil spring 58 tends to maintain armature member 57 in spatial relation to the core 55, but upon energization of solenoid winding 53 armature member 57 is drawn downwardly against the compression of coil spring 58. The armature member 57 is provided with a head on its upper end which is tapered upwardly and outwardly represented at 60 and is provided with a cylindrical end portion 61 at its terminus. This shaping is quite important because of the coaction between the head of the armature member 57 and the shaped locking lever or latching bar 22. The terminus of the armature member 57 slidably enters the cylindrical cap 62 which is slotted at one side thereof at 63 to permit entry of the lower end of the latching bar 22. The cylindrical cap 62 is supported in a stationary manner clamped between bracket 4 and panel 43 and located by panel 48 recess 48a. The armature member 57 is free to move up and down inside the cylindrical cap 62 with the latching bar 22 freely displaceable through one side of the cylindrical cap 62 at slot 63. Sufficient clearance is provided for the displacement of latching bar 22 by slotting the edges of panel 43 in alignment with the path of latching bar 22, as at 43a in panel 43. The latching bar 22 has a very special shape which includes the horizontally extending tongue 64 adapted to engage over the annular flange 65 of the sleeve 38 of the actuator switch assembly device 14, as represented in Fig. 8, or extend beneath flange 65 as represented in Fig. 4. The lower terminus of the latching bar 22 includes the depending portion 66 connected with the extending edge portion 67. This composite edge coacts with the head of the armature member 57 including the cylindrical portion 61 thereof and the tapered or frusto-conical portion 69 of the head 60 of the armature member 57. That is to say, downward movement of the cylindrical portion 61 and the frusto-conical portion 69 of head 60 produce a camming action on latching bar 22 displacing the bar to the positions necessary to allow the passage of annular flange 65 of sleeve 38 downwardly past the tongue 64 as represented in Fig. 7, enabling the flange 65 to be engaged by tongue 64, as represented in Fig. 8, whereby the actuator switch is maintained in its lowermost position represented in Figs. 6 and 8, as distinguished from the elevated position represented in Fig. 5 and the partially depressed position represented in Fig. 7.

The upper surface of the cylindrical cap 62 is recessed, as represented at 70, to provide a seat for the coil spring 71, which is seated at its upper end in the internal bore or recess 72 in the shank 15 of the switch actuator. The coil spring 71 normally biases the switch actuator to elevated position shown in Figs. 2, 4 and 5, and compresses when the switch actuator is pushed downwardly as in Fig. 7 and locked down as represented in Figs. 6 and 8. Then coil spring 71 is in readiness to exert a restoring force to move the switch actuator upwardly as soon as latching bar 22 is displaced laterally by momentary energization of the solenoid, and thus removing tongue 64 from the flange 65 of sleeve 38, as represented in Fig. 7, allowing coil spring 71 to expand and restore the switch actuator 14 to elevated position, shown in Figs. 2, 4, and 5.

Between votes, the actuator assembly 14 can be rotated horizontally to any of the three operating positions, but can be depressed vertically in the selected position only to a limited extent, until flange 65 strikes projection 64. This limited movement of the actuator assembly 14 is not sufficient to permit metallic member 35 to leave the "not voting" contact 39, or to permit spring tongue 35a to meet any of the voting contacts 49, 50 or 51. Hence no vote can be registered. This limited movement of the actuator assembly 14 however, does permit metallic member 35 to come in contact with the curved or pointed end 42 of the solenoid operating contact 41, but the solenoid will not operate because between votes, the remote switch 74 of Fig. 26 is open.

When a vote is called for, the remote switch 74 of Fig. 26 is closed, and the member may rotate the actuator assembly 14 to the desired position if he has not previously done so, and then when he depresses the actuator assembly 14 vertically he energizes the solenoid, when member 35 contacts 42, which moves the latching bar 22 until its projection 64 is removed from the path of flange 65, and so the actuator assembly 14 goes all the way down, breaking the connection between metallic member 35 and the "not-voting" contact 39, and establishing connection between spring 35a and whichever voting contact the member selected, Yea 49, Present 50, or Nay 51. Incidentally the actuator assembly 14, before reaching bottom of its vertical stroke, carries metallic member 35 down past the curved or pointed end 42 of contact 41, de-energizing its solenoid. Thus in the circuit of Fig. 26, which is the circuit of my invention, this is strictly an "open-circuit" switch, with the solenoid energized only for an instant in the middle of the vertical stroke of actuator assembly 14, and the solenoid never gets hot or overheated under any conditions. Solenoid 53 is energized by a momentary current impulse. Fig. 26 also shows how Page Switch 5 will operate a signal lamp 73 on a "Page-Call Board," and how Error Switch 6 will release or restore actuator 14 assembly, when Remote Switch 74 is closed, and how opening Remote Switch 74 will lock all voting switches by making the solenoid circuits inoperative, and how the momentary closing of both Remote Switches 74 and 75 will operate the solenoid 53 and so release or restore the actuator assembly 14 at each desk to the "not voting" position.

Fig. 27 shows a circuit variation that this same identical switch can employ, in which the solenoid 53 is not energized momentarily, but instead for a specific period of time. Operating contact 41 with curved or pointed end 42 is not used at all, and the solenoid 53, instead of being momentarily energized by it, is energized from the time the vote is opened, by closing remote switch 74 of Fig. 27, until the actuator assembly 14 has been sufficiently depressed to permit metallic element 35 to break connection with "not-voting" contact 39. Thus contact 39 breaks both "not-voting" and the solenoid. Solenoid 53 is energized from the time remote switch 74 is closed until either the remote switch 74 is opened to lock the vote or until switch actuator assembly 14 is depressed causing the breaking of the "not-voting" circuit 39 which 2,942,076 also de-energizes the solenoid 53. Page, Error and Remote Control circuits are the same as Fig. 26.

Fig. 28 shows that the circuit of Fig. 26 and the circuit of Fig. 27 can be modified to accommodate the use of an electrical lock 77, instead of the mechanical cover lock heretofore described. This does require an additional remote switch 76 and connection 78 thereto for by-passing the lock 77 to reset the switch actuator assembly 14. In Fig. 28 remote switch 74 is used to lock and unlock the switches, and 75 and 76 are momentarily closed to reset them. The electrical lock 77 can be used either in the circuit arrangement of Fig. 26 or the circuit arrangement of Fig. 27 at the position shown in Fig. 28. The extra remote switch 76 is used and the additional connection 78 provided is to by pass the electric lock 77.

Figs. 29, 30 and 31 explain more fully the arrangement of the electric lock 77 wherein the contacts 81 and 82 are always open with the lock locked and the key removed. Fig. 29 shows the contact springs 81 and 82 closed by terminal contacts 83 and 84 interconnected by rivet 85 extending through block of insulation 85 which may be oriented by moving the lock.

Fig. 30 shows lock 77 oriented to unlocked position with the circuit open and key 86 about to be removed.

Fig. 31 shows the manner in which terminal contacts 83 and 84 shunt the contact springs 81 and 82 through rivet 85 the view being taken on line 31—31 of Fig. 29.

While I have described my invention in certain of its preferred embodiments I realize that modifications may be made and I desire that it be understood that no limitations upon my invention are intended other than may be imposed by the scope of the appended claims.

What I claim as new and desire to secure by Letters Patent of the United States, is:

1. An electric circuit controller comprising a frame structure, a switch actuator guide mounted on said frame structure, electrical contacts insulatingly supported on said frame structure adjacent said switch actuator guide, an electrical solenoid supported by said frame structure adjacent the aforesaid electrical contacts, a switch actuator slidably and orientably mounted in said switch actuator guide and carrying electrical contacts and a contact arm thereon, and adapted to make electrical connection selectively with the aforesaid electrical contacts, means controlled by said electrical solenoid for latching said switch actuator in a selected position with respect to the contacts thereon and the contacts supported by said frame structure and, in which the means controlled by said electrical solenoid for latching said switch actuator consists of an armature member axially movable in said electrical solenoid and a latching bar pivotally mounted with respect to said frame structure and movable in the path of said armature member and means on said switch actuator engageable by said latching bar for maintaining said switch actuator in a selected displaced and oriented position.

2. An electric circuit controller comprising a frame structure, a switch actuator guide mounted in said frame structure, electrical contacts insulatingly supported on said frame structure adjacent said switch actuator guide, an electrical solenoid supported by said frame structure adjacent the aforesaid electrical contacts, said solenoid including an operating winding surrounding a bore therethrough, a switch actuator slidably and orientably mounted in said switch actuator guide and carrying electrical contacts and a contact arm thereon, and adapted to make electrical connection selectively with the aforesaid electrical contacts, means controlled by said electrical solenoid for latching said switch actuator in a selected position with respect to the contacts thereon and the contacts supported by said frame structure and, in which the means controlled by said electrical solenoid for latching said switch actuator comprises an armature member movable axially within the bore of the solenoid, a head on said armature member including a frusto-conical portion and a latching bar pivotally mounted with respect to said frame structure and having a terminus thereon engageable with the head on said armature member beneath the frusto-conical portion thereof for maintaining said switch actuator in a slidable and orientatable displaced position.

3. An electric circuit controller comprising a frame structure, a switch actuator guide mounted on said frame structure, electrical contacts insulatingly supported on said frame structure adjacent said switch actuator guide, an electrical solenoid supported by said frame structure adjacent the aforesaid electrical contacts, said solenoid including an operating winding surrounding a bore therethrough, a switch actuator slidably and orientably mounted in said switch actuator guide and carrying electrical contacts and a contact arm thereon, and adapted to make electrical connection selectively with the aforesaid electrical contacts, means controlled by said electrical solenoid for latching said switch actuator in a selected position with respect to the contacts thereon and the contacts supported by said frame structure and, in which said means for latching said switch actuator includes an armature member slidable in the bore of said solenoid in a direction coaxial with said switch actuator and means axially disposed between the end of said switch actuator and said armature member for biasing said switch actuator and said armature member to positions displaced from each other.

4. An electric circuit controller comprising a frame structure, a switch actuator guide mounted on said frame structure, electrical contacts insulatingly supported on said frame structure adjacent said switch actuator guide, an electrical solenoid supported by said frame structure adjacent the aforesaid electrical contacts, said solenoid including an operating winding surrounding a bore therethrough, a switch actuator slidably and orientably mounted in said switch actuator guide and carrying electrical contacts and a contact arm thereon, and adapted to make electrical connection selectively with the aforesaid electrical contacts, means controlled by said electrical solenoid for latching said switch actuator in a selected position with respect to the contacts thereon and the contacts supported by said frame structure and, in which said means for latching said switch actuator comprises an armature member slidably in the bore of said solenoid coaxial with the axis of said switch actuator, a frusto-conical head on said armature member, a cylindrical cap carried by said frame structure in coaxial alignment with the path of movement of said armature member for slidably receiving the frusto-conical head of said armature member and a latching bar pivoted with respect to said frame structure and extending through a slot in one side of said cylindrical cap in a position engageable by the frusto-conical head of said armature member for controlling the lateral displacement of said latching bar and means on said switch actuator coacting with means on said latching bar for maintaining said switch actuator in interconnected relation to said armature member for correspondingly maintaining the continuity of the circuits established through said electrical contacts.

5. An electric circuit controller comprising a frame structure, a switch actuator guide mounted on said frame structure, electrical contacts insulatingly supported on said frame structure adjacent said switch actuator guide, an electrical solenoid supported by said frame structure adjacent the aforesaid electrical contacts, said solenoid including an operating winding surrounding a bore therethrough, a switch actuator slidably and orientably mounted in said switch actuator guide and carrying electrical contacts and a contact arm thereon, and adapted to make electrical connection selectively with the aforesaid electrical contacts, means controlled by said electrical solenoid for latching said switch actuator in a selected position with respect to the contacts thereon and the contacts supported by said frame structure and in which the means controlled by said electrical solenoid for latching said switch actuator in a selected position includes an armature slidable within the bore of said solenoid and a latching bar pivoted with respect to said frame structure and movable in the path of said armature, a cylindrical cap mounted on said frame structure and having an internal bore into and out of which said armature is adapted to move, said cap being centrally recessed and a coil spring interposed between said recess and said switch actuator for normally biasing said switch actuator in a position displaced from said cap, the said latching bar projecting through a slot in one side of said cap and being engageable with said armature.

6. An electric circuit controller comprising a frame structure, a switch actuator guide mounted on said frame structure, electrical contacts insulatingly supported on said frame structure adjacent said switch actuator guide, an electrical solenoid supported by said frame structure adjacent the aforesaid electrical contacts, a switch actuator slidably and orientably mounted in said switch actuator guide and carrying electrical contacts and a contact arm thereon, and adapted to make electrical connection selectively with the aforesaid electrical contacts, means controlled by said electrical solenoid for latching said switch actuator in a selected position with respect to the contacts thereon and the contacts supported by said frame structure and in which the means controlled by the electrical solenoid for latching the switch actuator includes an annular flange on the end of said switch actuator, a latching bar pivotally mounted with respect to said frame structure and extending lineally of the path of movement of said switch actuator, and an armature member operated by said solenoid, said armature member having a headed end engageable with the depending end of said latching bar whereby movement of said armature member displaces said latching bar in a radial direction into and out of engagement with the flange on the end of said switch actuator, means for biasing said switch actuator, away from said armature member, and means for biasing said latching bar toward said switch actuator.

References Cited in the file of this patent

UNITED STATES PATENTS

| | | |
|---|---|---|
| 1,110,027 | Aitken | Sept. 8, 1914 |
| 1,649,480 | McLaughlin | Nov. 15, 1927 |
| 2,276,219 | Lemmon | Mar. 10, 1942 |
| 2,295,499 | Franck | Sept. 8, 1942 |
| 2,313,166 | Nicholas | Mar. 9, 1943 |
| 2,324,474 | Appel | July 20, 1943 |
| 2,492,078 | Welch | Dec. 20, 1949 |
| 2,545,172 | Sensinger | Mar. 13, 1951 |
| 2,570,481 | Friesmeyer | Oct. 9, 1951 |
| 2,594,181 | Kliegl | Apr. 22, 1952 |

FOREIGN PATENTS

| | | |
|---|---|---|
| 419,727 | France | Jan. 13, 1911 |
| 826,715 | France | Dec. 23, 1936 |